(12) United States Patent
Albero et al.

(10) Patent No.: US 11,627,152 B2
(45) Date of Patent: Apr. 11, 2023

(54) REAL-TIME CLASSIFICATION OF CONTENT IN A DATA TRANSMISSION

(71) Applicant: Bank of America Corporation, Charlotte, NC (US)

(72) Inventors: George Albero, Charlotte, NC (US); Gulsen Saffel, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 620 days.

(21) Appl. No.: 16/737,005

(22) Filed: Jan. 8, 2020

(65) Prior Publication Data

US 2021/0211446 A1 Jul. 8, 2021

(51) Int. Cl.
*H04L 29/06* (2006.01)
*G06N 20/00* (2019.01)
*H04L 9/40* (2022.01)

(52) U.S. Cl.
CPC ......... *H04L 63/1425* (2013.01); *G06N 20/00* (2019.01); *H04L 63/1433* (2013.01)

(58) Field of Classification Search
CPC ............ H04L 63/1425; H04L 63/1433; H04L 63/1441; H04W 12/121; G06N 20/00
See application file for complete search history.

(56) References Cited

U.S. PATENT DOCUMENTS

| | | | |
|---|---|---|---|
| 7,685,271 B1 | 3/2010 | Schneider et al. | |
| 8,407,798 B1 | 3/2013 | Lotem et al. | |
| 9,412,073 B2 | 8/2016 | Brandt et al. | |
| 9,578,060 B1* | 2/2017 | Brisebois | G06F 11/3438 |
| 9,692,731 B2 | 6/2017 | Acharya et al. | |
| 9,696,346 B2 | 7/2017 | Pietrowicz et al. | |
| 9,866,532 B2 | 1/2018 | Acharya et al. | |
| 9,871,811 B2 | 1/2018 | Lambert et al. | |

(Continued)

FOREIGN PATENT DOCUMENTS

JP 2015015581 A 1/2015

OTHER PUBLICATIONS

F. Shaman, B. Ghita, N. Clarke and A. Alruban, "User Profiling Based on Application-Level Using Network Metadata," 2019 7th International Symposium on Digital Forensics and Security (ISDFS), 2019, pp. 1-8, doi: 10.1109/ISDFS.2019.8757503. (Year: 2019).*

(Continued)

*Primary Examiner* — Baotran N To
*Assistant Examiner* — Thomas A Gyorfi
(74) *Attorney, Agent, or Firm* — Banner & Witcoff, Ltd.

(57) ABSTRACT

Aspects of the disclosure relate to real-time classification of content in a data transmission. A computing platform may detect, in real-time and via a computing device, a plurality of data transmissions between applications over a communications network. Then, the computing platform may retrieve, for a particular data transmission of the plurality of data transmissions, a content of the particular data transmission. The computing platform may then analyze, via the computing device, the content. Subsequently, the computing platform may determine, in real-time via the computing device and based on the analyzing, a security classification for the content. Then, the computing platform may cause, in real-time via the computing device, the content to be marked with the determined security classification.

20 Claims, 5 Drawing Sheets

(56) References Cited

U.S. PATENT DOCUMENTS

| | | |
|---|---|---|
| 9,930,065 B2 | 3/2018 | Nelms et al. |
| 10,187,413 B2 | 1/2019 | Vasseur et al. |
| 10,454,950 B1 | 10/2019 | Aziz |
| 10,708,294 B2 | 7/2020 | Northway, Jr. et al. |
| 11,184,381 B2 | 11/2021 | Albero et al. |
| 11,297,085 B2 | 4/2022 | Albero et al. |
| 2010/0284288 A1 | 11/2010 | Lee et al. |
| 2012/0110345 A1 | 5/2012 | Pigeon et al. |
| 2012/0303476 A1 | 11/2012 | Krzyzanowski et al. |
| 2012/0331544 A1 | 12/2012 | Bostrom et al. |
| 2013/0198845 A1 | 8/2013 | Anvari |
| 2013/0298201 A1 | 11/2013 | Aravindakshan et al. |
| 2014/0013396 A1 | 1/2014 | Field-Eliot et al. |
| 2015/0271201 A1 | 9/2015 | Ruvio et al. |
| 2016/0072709 A1 | 3/2016 | Moore |
| 2016/0088022 A1 | 3/2016 | Handa et al. |
| 2016/0182559 A1 | 6/2016 | Francy et al. |
| 2016/0330222 A1 | 11/2016 | Brandt et al. |
| 2017/0099208 A1 | 4/2017 | Wang et al. |
| 2017/0149811 A1 | 5/2017 | Corrales et al. |
| 2017/0208077 A1 | 7/2017 | Freedman et al. |
| 2017/0244749 A1 | 8/2017 | Shulman et al. |
| 2018/0004152 A1 | 1/2018 | Nishino |
| 2018/0012486 A1 | 1/2018 | Israelsson |
| 2018/0048663 A1 | 2/2018 | Yura et al. |
| 2018/0152523 A1 | 5/2018 | Lohse et al. |
| 2018/0159884 A1* | 6/2018 | Meier ................. H04L 63/1425 |
| 2018/0191782 A1 | 7/2018 | Djordjevic et al. |
| 2018/0197105 A1* | 7/2018 | Luo ......................... G06N 5/04 |
| 2018/0212985 A1 | 7/2018 | Zadeh et al. |
| 2018/0288063 A1 | 10/2018 | Koottayi et al. |
| 2018/0359259 A1 | 12/2018 | Leon |
| 2019/0068614 A1 | 2/2019 | Bhatnagar et al. |
| 2019/0098019 A1 | 3/2019 | Coleman et al. |
| 2019/0104108 A1 | 4/2019 | Rhee et al. |
| 2020/0134083 A1* | 4/2020 | Elliman .................. G06F 17/18 |
| 2020/0296126 A1 | 9/2020 | Compagna et al. |
| 2020/0380160 A1* | 12/2020 | Kraus ..................... G06F 16/35 |
| 2021/0092132 A1 | 3/2021 | Bhatia et al. |
| 2021/0092138 A1 | 3/2021 | Clark et al. |
| 2021/0092153 A1 | 3/2021 | Wei et al. |
| 2021/0112091 A1 | 4/2021 | Compton |
| 2021/0211445 A1 | 7/2021 | Albero et al. |
| 2021/0211446 A1 | 7/2021 | Albero et al. |
| 2021/0250365 A1 | 8/2021 | Atkinson et al. |

OTHER PUBLICATIONS

Matsumoto et al., A Method of Preventing Unauthorized Data Transmission in Contoller Area Network, 2012; IEEE 75th Vehicular Technology Conference (VTC Spring) Year: 2012; Conference Paper; Publisher IEEE.

Setyawan, et al. Web Services Security and Threats: A Systematic Literature Review; 2020; International Conference on ICT for Smart Society (ICISS) Year 2020; vol. CFP2013V-ART; Conference Paper; Publisher IEEE.

* cited by examiner

REAL-TIME CLASSIFICATION OF CONTENT IN A DATA TRANSMISSION

BACKGROUND

Aspects of the disclosure relate to deploying digital data processing systems to protect enterprise resources. In particular, one or more aspects of the disclosure relate to real-time classification of content in a data transmission.

Enterprise organizations may utilize various resources to support their computing infrastructure. For large enterprise organizations, maintaining, updating, and managing network activity over the various enterprise resources may be particularly advantageous in protecting confidential information and/or other sensitive data that is created, transmitted, and/or used for various purposes. It may be helpful to analyze data flow between applications to monitor the content of the data flow, determine if appropriate security controls are being applied, and determine a security classification of the content. As data flows through the network in real-time, such monitoring and determining of the content of network activity may be time-sensitive and there may be significant advantages for the monitoring and determining to be performed in real-time as well. Ensuring that discrepancies in a security classification of content in a data transmission may be detected, and timely and targeted remediation measures may be performed, in real time with speed and accuracy, may be particularly advantageous to ensure a smooth running of an enterprise infrastructure. In many instances, however, it may be difficult to analyze data flow, in an organization's complex network comprising a vast number of network devices and users, while also attempting to optimize network resources, bandwidth utilization, and efficient operations of the computing infrastructure.

SUMMARY

Aspects of the disclosure provide effective, efficient, scalable, fast, reliable, and convenient technical solutions that address and overcome the technical problems associated with real-time classification of content in a data transmission.

In accordance with one or more embodiments, a computing platform having at least one processor, a communication interface, and memory may detect, in real-time and via a computing device, a plurality of data transmissions between applications over a communications network. Then, the computing platform may retrieve, for a particular data transmission of the plurality of data transmissions, a content of the particular data transmission. The computing platform may then analyze, via the computing device, the content. Subsequently, the computing platform may determine, in real-time via the computing device and based on the analyzing, a security classification for the content. Then, the computing platform may cause, in real-time via the computing device, the content to be marked with the determined security classification.

In some embodiments, the computing platform may train a machine learning model to generate a new security classification. In some embodiments, the security classification for the content may be based on the new security classification.

In some embodiments, the computing platform may train a machine learning model to perform the determining the security classification for the content. In some embodiments, the computing platform may apply the machine learning model to perform the determining the security classification for the content.

In some embodiments, the computing platform may identify, for the particular data transmission, one or more prior transmissions associated with the particular data transmission. Then, the computing platform may determine prior content associated with the one or more prior transmissions. In some embodiments, the determining the security classification may be based on the prior content.

In some embodiments, the computing platform may identify, for the particular data transmission, a reported security classification for the content. Then, the computing platform may detect an anomaly between the reported security classification and the determined security classification. In some embodiments, the computing platform may trigger one or more security actions based on the detected anomaly. In some embodiments, the one or more security actions may include modifying, based on a machine learning model, the reported security classification.

In some embodiments, the computing platform may retrieve, via the computing device and from a repository and for the particular data transmission, a first security profile associated with a source application, and a second security profile associated with a destination application. Then, the computing platform may, based on a determination that the security classification is not compatible with one or more of the first security profile and the second security profile, trigger one or more security actions for the particular data transmission.

In some embodiments, the computing platform may, based on a determination that the security classification is compatible with one or more of the first security profile and the second security profile, release the particular data transmission to the destination application.

In some embodiments, the computing platform may detect, based on a determination that the first security profile does not match the second security profile, a potentially unauthorized data transmission. In some embodiments, the retrieving the content of the particular data transmission may include retrieving the content of the potentially unauthorized data transmission.

In some embodiments, the computing platform may identify a first user associated with the source application. Then, the computing platform may identify a second user associated with the destination application. In some embodiments, the retrieving the first security profile may include retrieving a first access authorization associated with the first user. In some embodiments, the retrieving the second security profile may include retrieving a second access authorization associated with the second user.

In some embodiments, the computing platform may determine, prior to the retrieving the first security profile and the second security profile, and for each data transmission of the plurality of data transmissions, a first indication whether the data transmission was sent by the source application, and a second indication whether the data transmission was received by the destination application. Then, the computing platform may compare, via the computing device and in real-time and for each data transmission of the plurality of data transmissions, the first indication and the second indication. Subsequently, the computing platform may detect, via the computing device and based on a determination that the first indication does not match the second indication, an anomalous data transmission. In some embodiments, the retrieving the first security profile and the second security profile may be performed for the anomalous data transmission.

In some embodiments, the one or more security actions may include modifying, via the computing device, one or more of the first security profile and the second security profile.

In some embodiments, the one or more security actions may include preventing, via the computing device, a data transmission related to the particular data transmission.

In some embodiments, the one or more security actions may include generating a risk profile of an enterprise user associated with the particular data transmission, where the risk profile may be indicative of a likelihood of the enterprise user to transmit an unauthorized data transmission. In some embodiments, the computing platform may, based on a determination that the enterprise user is associated with an unauthorized data transmission, send a notification to the enterprise user. Then, the computing platform may detect another unauthorized data transmission associated with the enterprise user. Subsequently, the computing platform may update the risk profile of the enterprise user to indicate a high likelihood of the enterprise user to transmit an additional unauthorized data transmission.

In some embodiments, the one or more security actions may include generating a risk profile of an application associated with the particular data transmission, where the risk profile may be indicative of a likelihood of the application to transmit an unauthorized data transmission.

Implementations of the described techniques may include hardware, a method or process, or computer software on a computer-accessible medium.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
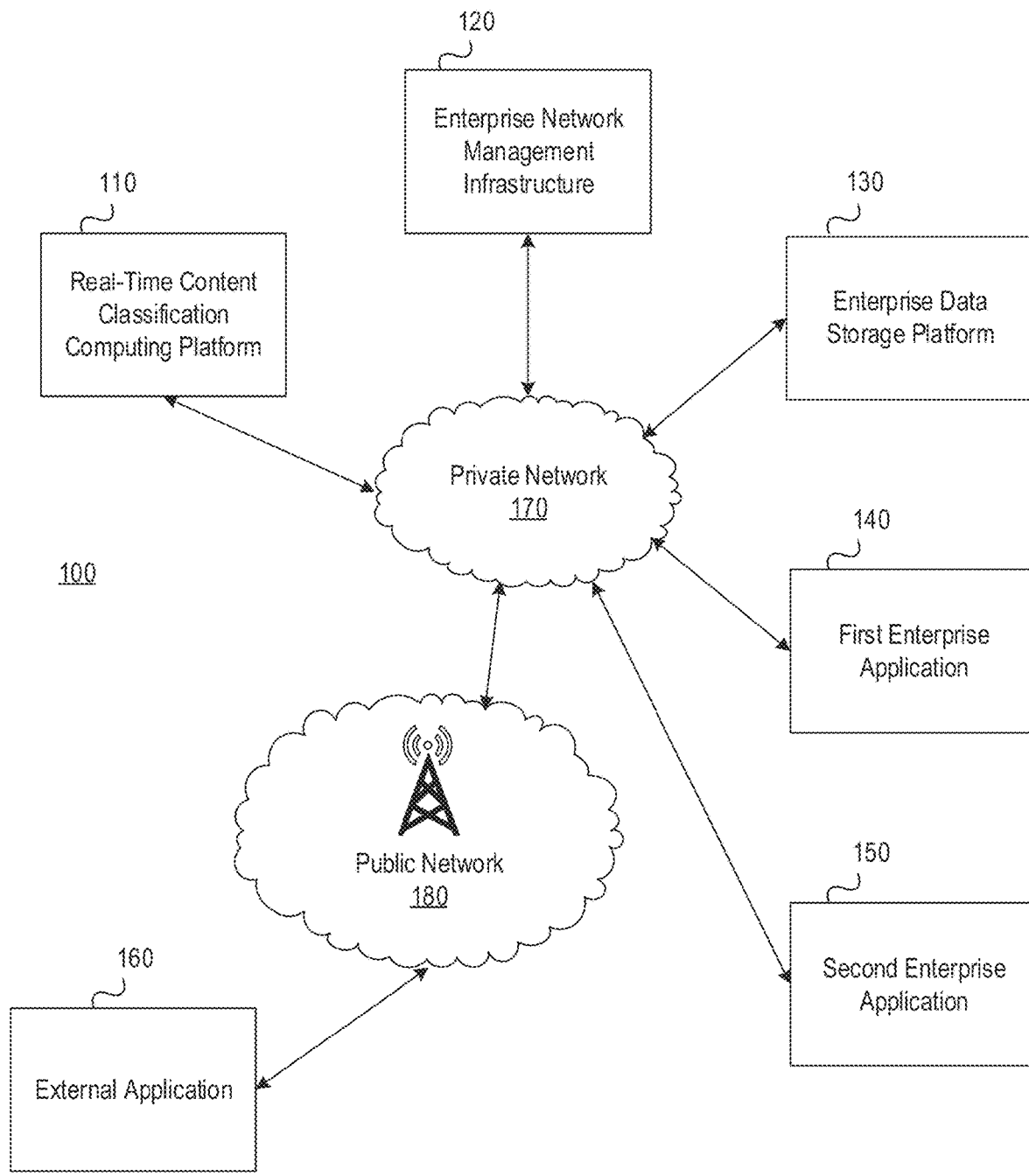
FIGS. 1A and 1B depict an illustrative computing environment for a real-time classification of content in a data transmission in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired, or wireless, and that the specification is not intended to be limiting in this respect.

Some aspects of the disclosure relate to a real-time classification of content in a data transmission, and causing the content to be marked with a security classification. Some aspects of the disclosure relate to triggering steps to mitigate the effects of un-marked and/or incorrectly marked content. For example, an enterprise network management infrastructure may deploy computing resources such as network devices, web resources, file directories, software applications, and so forth. In some instances, content may be generated by an enterprise user with restricted access based, for example, on the enterprise user's role within the enterprise organization, their risk profile, and application's use restrictions, and so forth. In some instances, such content may include confidential information that may be inadvertently shared with other users and/or applications that may not be privy to such content. For large enterprise organizations with vast amounts of deployed resources and a large number of employees, a large amount of data may be exchanged between applications and/or users. In some instances, such data transmissions, unless adequately monitored, may pose a large security threat to the enterprise services. For large enterprise organizations with vast amounts of deployed resources and a large number of employees, data transmissions may take varied and complex forms, and may require real-time monitoring.

For example, it may be particularly advantageous to have accurate and complete information on content of data being transmitted between systems and applications. For example, confidential data may be exchanged between secured applications and it may be pertinent to know if a source application and/or a destination application of the data transmission are associated with security profiles compatible with access to the confidential data. Such information may be pertinent to preventing a data leak, since a first application may be sending data to an intended recipient, and if the intended recipient is not authorized to receive the data, then there may be a need to timely intervention and/or remediation.

Generally, it may not be possible to manually manage such a vast array of network users and devices, with near-continuous flow of data. Accordingly, it may be particularly advantageous for a large enterprise organization (e.g., financial institution), with large amounts of confidential information to determine, in real-time, security classifications for content, and mark the content appropriately.

Accordingly, aspects of this disclosure relate to automated monitoring of content of data transmissions to identify anomalies in security classifications of content in real-time, and initiate actions to mitigate such anomalies. Determining the security classification of the content of a data transmission via a manual process and/or based on mental steps is unlikely because it relates to vast amounts of real-time network data traffic, and such network data traffic may be rapidly changing in real-time over thousands of enterprise resources. Also, since the network data may reside and/or be exchanged over a vast array of users, internal and external applications, and network devices, it necessitates a use of computing devices specifically configured to access the information associated with the plurality of data transmissions over networks, determine security classifications, mark the content with the security classification, and/or initiate relevant action in real-time and over the network. It may be noted that as data transmissions occur over a computing network, the problem of detecting potentially harmful activities across an enterprise infrastructure arises in the realm of networks, and as described herein, a solution is necessarily rooted in computer technology to overcome a problem arising in the realm of computer networks.

Figure 1B:
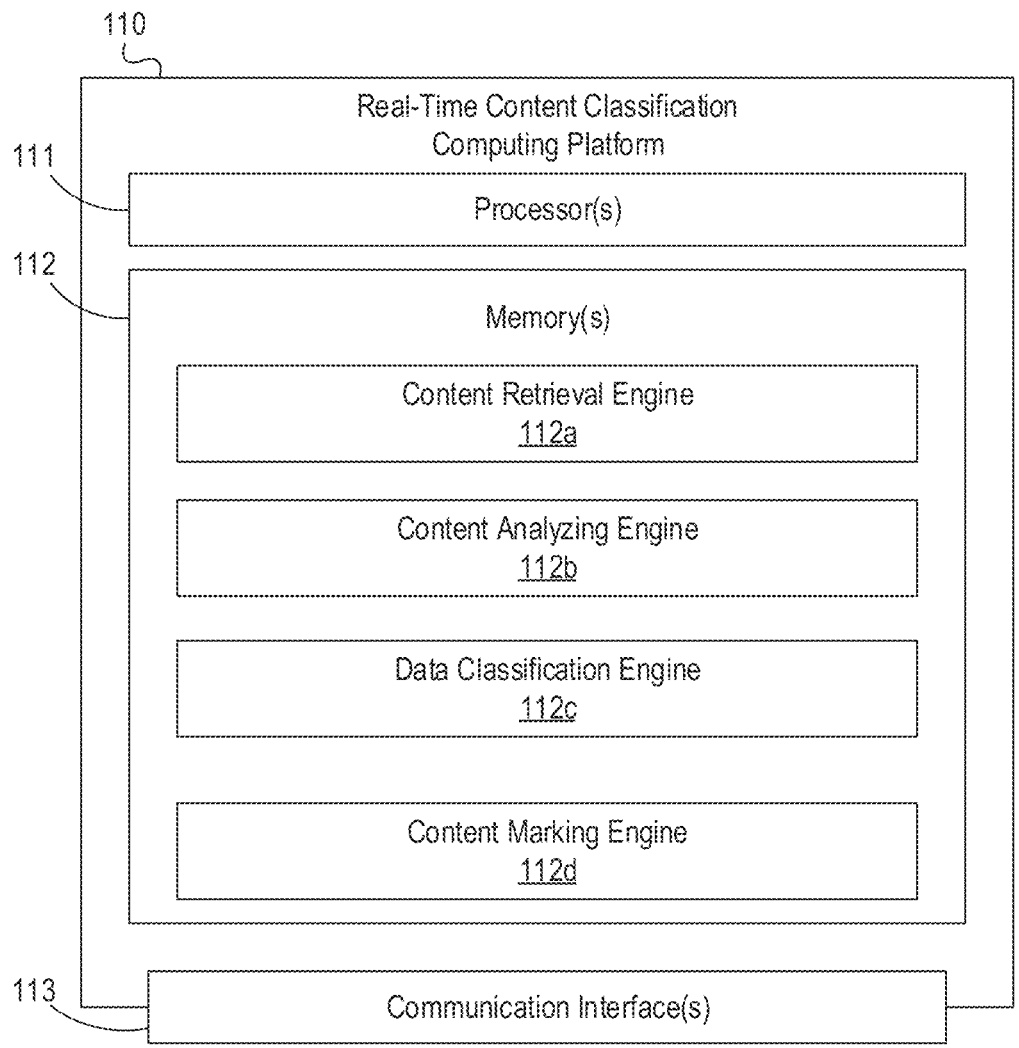

FIGS. 1A and 1B depict an illustrative computing environment for a real-time classification of content in a data transmission in accordance with one or more example embodiments. Referring to FIG. 1A, computing environment 100 may include one or more computer systems. For example, computing environment 100 may include real-time content classification computing platform 110, enterprise network management infrastructure 120, enterprise data storage platform 130, first enterprise application 140, second enterprise application 150, and external application 160.

As illustrated in greater detail below, real-time content classification computing platform 110 may include one or more computing devices configured to perform one or more of the functions described herein. For example, real-time content classification computing platform 110 may include one or more computers (e.g., laptop computers, desktop computers, servers, server blades, or the like) and/or other computer components (e.g., processors, memories, communication interfaces).

Enterprise network management infrastructure 120 may include one or more computing devices and/or other computer components (e.g., processors, memories, communication interfaces). In addition, enterprise network management infrastructure 120 may be configured to manage, host, execute, and/or otherwise provide one or more enterprise applications (e.g., first enterprise application 140, second enterprise application 150). For example, enterprise network management infrastructure 120 may be configured to manage, host, execute, and/or otherwise provide a computing platform for various network devices and enterprise applications. In some instances, enterprise network management infrastructure 120 may be configured to provide various enterprise and/or back-office computing functions for an enterprise organization, such as a financial institution. For example, enterprise network management infrastructure 120 may include various servers and/or databases that store and/or otherwise maintain account information, such as financial account information including account balances, transaction history, account owner information, and/or other information. Also, for example, enterprise network management infrastructure 120 may include various servers and/or databases that may manage information technology resources for the enterprise organization. For example, enterprise network management infrastructure 120 may include various servers and/or databases that may manage security profiles associated with enterprise application. Generally, security profiles may be based on job functions, job roles, geographic region, and so forth. Additionally, or alternatively, enterprise network management infrastructure 120 may receive instructions from real-time content classification computing platform 110 and execute the instructions in a timely manner.

Enterprise data storage platform 130 may include one or more computing devices and/or other computer components (e.g., processors, memories, communication interfaces). In addition, and as illustrated in greater detail below, enterprise data storage platform 130 may be configured to store and/or otherwise maintain enterprise data, including access controls to network devices and/or other resources hosted, executed, and/or otherwise provided by enterprise network management infrastructure 120. Also, for example, enterprise data storage platform 130 may be configured to store and/or otherwise maintain information associated with data transmissions between enterprise applications (e.g., first enterprise application 140, second enterprise application 150), and/or between an enterprise application and an external vendor application (e.g., first enterprise application 140 and external application 160). As another example, enterprise data storage platform 130 may be configured to store and/or otherwise maintain information associated with security profiles for applications (e.g., first enterprise application 140, second enterprise application 150, external application 160). As another example, enterprise data storage platform 130 may be configured to store and/or otherwise maintain security classifications for information, and/or associations between security classifications and security profiles. Additionally, or alternatively, enterprise network management infrastructure 120 may load data from enterprise data storage platform 130, manipulate and/or otherwise process such data, and return modified data and/or other data to enterprise data storage platform 130 and/or to other computer systems included in computing environment 100.

First enterprise application 140 and second enterprise application 150 may be applications utilized by the enterprise organization, and managed, hosted, executed, and/or otherwise provided by enterprise network management infrastructure 120. For example, first enterprise application 140 may be a financial application and second enterprise application 150 may be an accounting application. Also, for example, enterprise application 140 may be a travel reservation related application and second enterprise application 150 may be an expense management application. Also, for example, first enterprise application 140 may be a word processing application and second enterprise application 150 may be a telecommunications application. The term "enterprise application" as used herein, may generally refer to any application used within as enterprise organization. For example, an enterprise application may be a stand-alone application, or a suite of applications.

External application 160 may be an application provided by a vendor. For example, external application 160 may be a human resource application, a travel management application, a health insurance provider application, payment processing application, a voice over IP ("VOIP") service application, and so forth. The term "external application" as used herein, may generally refer to any application provided by an external vendor to an enterprise organization.

Enterprise applications and/or external applications may be related to billing and invoicing systems, payment processing systems, security investigation and mitigation systems, payroll systems, human resource systems, sales related platforms, production environment systems, product design and control systems, enterprise planning systems, enterprise resource management systems, web services hosting platforms, networks management tools, legal function management platforms, and so forth.

Computing environment 100 also may include one or more networks, which may interconnect one or more of real-time content classification computing platform 110, enterprise network management infrastructure 120, enterprise data storage platform 130, first enterprise application 140, second enterprise application 150, and external application 160. For example, computing environment 100 may include private network 170 (which may interconnect, for example, real-time content classification computing platform 110, enterprise network management infrastructure 120, and enterprise data storage platform 130, first enterprise application 140, second enterprise application 150, and/or one or more other systems (which may be associated with an organization, such as a financial institution), and public network 180 (which may interconnect, for example, external application 160 with private network 170 and/or one or more other systems, public networks, sub-networks, and/or the like). For example, public network 180 may interconnect external application 160 with first enterprise application 140 and/or second enterprise application 150 via private network 170. In some instances, public network 180 may be a high generation cellular network, such as, for example, a fifth generation ("5G") or higher cellular network. In some instances, private network 170 may likewise be a high generation cellular enterprise network, such as, for example, a 5G or higher cellular network.

In one or more arrangements, real-time content classification computing platform 110, enterprise network management infrastructure 120, enterprise data storage platform 130, first enterprise application 140, second enterprise application 150, and external application 160, and/or the other systems included in computing environment 100 may be any type of computing device capable of communicating with a user interface, receiving input via the user interface, and communicating the received input to one or more other computing devices. For example, real-time content classification computing platform 110, enterprise network management infrastructure 120, enterprise data storage platform 130, first enterprise application 140, second enterprise application 150, and external application 160, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of real-time content classification computing platform 110, enterprise network management infrastructure 120, enterprise data storage platform 130, first enterprise application 140, second enterprise application 150, and external application 160, may, in some instances, be special-purpose computing devices configured to perform specific functions.

Referring to FIG. 1B, real-time content classification computing platform 110 may include one or more processors 111, memory 112, and communication interface 113. A data bus may interconnect processor 111, memory 112, and communication interface 113. Communication interface 113 may be a network interface configured to support communication between real-time content classification computing platform 110 and one or more networks (e.g., public network, private network, a local network, or the like). Memory 112 may include one or more program modules having instructions that when executed by processor 111 cause real-time content classification computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of real-time content classification computing platform 110 and/or by different computing devices that may form and/or otherwise make up real-time content classification computing platform 110.

For example, memory 112 may have, store, and/or include content retrieval engine 112a, content analyzing engine 112b, data classification engine 112c, and content marking engine 112d. Content retrieval engine 112a engine may have instructions that direct and/or cause real-time content classification computing platform 110 to detect, in real-time and via a computing device, a plurality of data transmissions between applications over a communications network. Content retrieval engine 112a engine may also have instructions that direct and/or cause real-time content classification computing platform 110 to retrieve, for a particular data transmission of the plurality of data transmissions, a content of the particular data transmission. Content retrieval engine 112a engine may also have instructions that direct and/or cause real-time content classification computing platform 110 to retrieve, via the computing device and from a repository and for the particular data transmission, a first security profile associated with a source application, and a second security profile associated with a destination application.

Content analyzing engine 112b may have instructions that direct and/or cause real-time content classification computing platform 110 to analyze, via the computing device, the content of the particular data transmission. Data classification engine 112c may have instructions that direct and/or cause real-time content classification computing platform 110 to determine, in real-time via the computing device and based on the analyzing, a security classification for the content. Content Marking engine 112d may have instructions that direct and/or cause real-time content classification computing platform 110 to cause, in real-time via the computing device, the content to be marked with the determined security classification.

Figure 2:
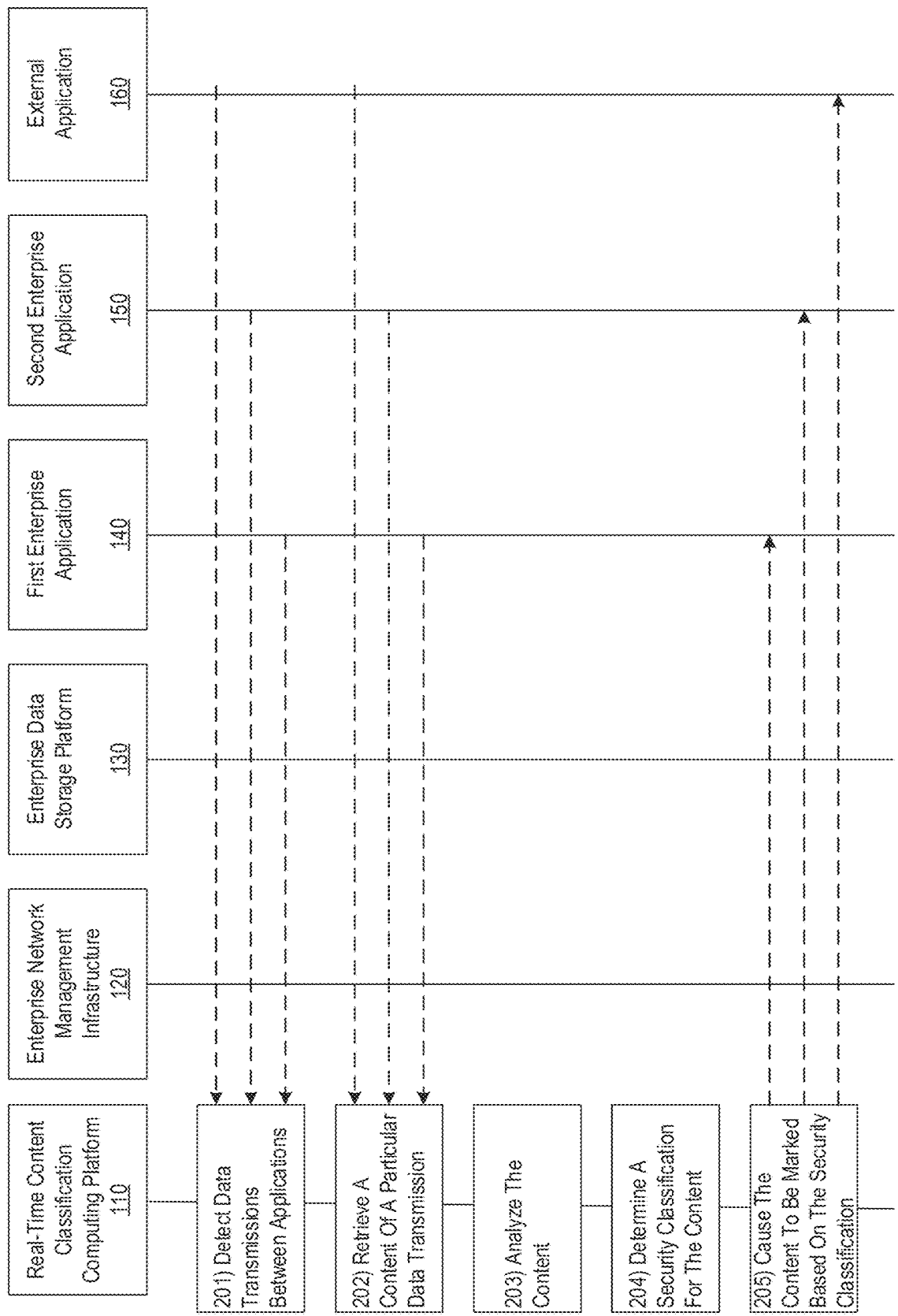
FIG. 2 depicts an illustrative event sequence for a real-time classification of content in a data transmission in accordance with one or more example embodiments.

FIG. 2 depicts an illustrative event sequence for a real-time classification of content in a data transmission in accordance with one or more example embodiments. Referring to FIG. 2, at step 201, real-time content classification computing platform 110 may detect, in real-time and via a computing device, a plurality of data transmissions between applications over a communications network. As described herein, enterprise network management infrastructure 120 may be configured to manage, host, execute, and/or otherwise provide one or more enterprise applications. Network devices within enterprise network management infrastructure 120 may generate large volumes of data transmissions, including machine-generated transmissions. For example, network devices, such as, various servers and/or databases, sensors, routers, computing devices, printers, scanners, building entry verification devices, cameras, and so forth, may generate vast amounts of data. Additional devices may include, for example, web resources, firewalls, and/or operating systems. Such data may include, for example, access data, log data, location data, data on software updates, diagnostic data, user and/or account data, and so forth.

Generally, applications (e.g., first enterprise application 140, second enterprise application 150, external application 160) may communicate with one another to exchange information via data transmissions. For example, each data transmission may originate at an application (e.g., source application) and a second application (e.g., destination application) may be an intended recipient. For example, a source application may initiate a data transmission to request information, and the destination application may receive this request. In response, the destination application may provide the requested information by initiating a data transmission to the requesting (e.g., source) application. Data transmissions may include exchange of data packets over a network. Content of the data transmission may include electronic communication messages, HTML documents, word processing documents, media content, audio and/or visual content, data packets associated with telecommunications, and so forth.

In some embodiments, the source application and the destination application may be associated with an enterprise organization. For example, the source application may be, for example, first enterprise application 140, and the destination application may be, for example, second enterprise application 150. In some embodiments, the source application may be associated with an enterprise organization, and the destination application may be associated with an external vendor organization. For example, the source application may be, for example, first enterprise application 140, and the destination application may be, for example, external application 160. In some embodiments, the destination application may be associated with an enterprise organization, and the source application may be associated with an external vendor organization. For example, the source application may be, for example, external application 160, and the destination application may be, for example, second enterprise application 150.

At step 202, real-time content classification computing platform 110 may retrieve, for a particular data transmission of the plurality of data transmissions, a content of the particular data transmission. Real-time content classification computing platform 110 may retrieve data from a variety of sources, including, for example, via an application programming interface ("API"). In some embodiments, real-time content classification computing platform 110 may monitor an enterprise device via a device access manager, and/or device driver. Also, for example, data may be retrieved from log files (server log files, database log files, application activity files), network management devices, network routers, and so forth. For example, data packets sent over a network may include headers that list source and/or destination network nodes for the data packet, a communication path for the data packet, and so forth.

At step 203, real-time content classification computing platform 110 may analyze, via the computing device, the content. For example, real-time content classification computing platform 110 may retrieve an actual content of the data transmission for further analysis. For example, if the data transmission is a textual communication, real-time content classification computing platform 110 may utilize text processing techniques to analyze the textual communication to determine and/or confirm unauthorized activity. In some embodiments, real-time content classification computing platform 110 may validate, authorize, and/or modify a data classification of the content associated with the data transmission. Also, for example, if the data transmission is an audio communication, real-time content classification computing platform 110 may utilize speech-to-text processing techniques and/or speech recognition techniques to analyze the audio communication to determine and/or confirm unauthorized activity. Additional, or alternate techniques may be utilized to further detect unauthorized activity associated with an anomalous data transmission.

For example, real-time content classification computing platform 110 may scan the content. As used herein, the content may include textual data such as a header, metadata, and so forth. For example, the transmission may be an electronic communication, and the content may include, for example, a body, a header, a subject, an attachment, and so forth. Real-time content classification computing platform 110 may utilize one or more techniques to scan the content. For example, real-time content classification computing platform 110 may perform optical character recognition ("OCR") to scan the content. In some embodiments, a neural network-based methodology may be utilized to recognize the textual data (e.g., for hand-written documents).

In some embodiments, a textual analysis may be performed, for example, based on natural language processing, part-of-speech tagging, parsing, maximum entropy language models, neural networks, and so forth. In some embodiments, real-time content classification computing platform 110 may perform the analysis based on a language model. Generally, a language model may be a probability distribution over a collection of words. In some instances, the language model may depend on a set of words that appeared previously (e.g., unigram models, n-gram models, bidirectional models, and so forth). In some embodiments, a language model may differentiate between two collections of words that may sound similar but have different meanings. For example, the collections of words, "lets meet for wine" and "lets meet at nine" sound similar, but have different meanings.

In some embodiments, real-time content classification computing platform 110 may analyze the content to identify one or more key terms and/or formatting indicative of a security classification. For example, customer lists may generally include names and pertinent contact information for customers. In some instances, such customer lists may be arranged in an Excel format, and real-time content classification computing platform 110 may identify the content as highly confidential information. As another example, financial statements may have a column for accounts payable, a column for accounts receivable, and names and other information related to products, customers, and vendors. Based in part on such information, real-time content classification computing platform 110 may identify the content as highly confidential information.

At step 204, real-time content classification computing platform 110 may determine, in real-time via the computing device and based on the analyzing, a security classification for the content. Generally, enterprise organizations may associate security classifications with categories of information. For example, the security classifications may be, for example, public information, non-confidential information, confidential information, highly confidential information, highly confidential trade secret, highly confidential proprietary information, highly confidential personal information, and so forth. In some embodiments, the security classifications may be labeled hierarchically, as, for example, "Level 1," "Level 2," and so forth, where an increase in numbering may indicate an increased level of security. In some embodiments, the security classification may be associated with a security profile of an application. For example, access restrictions of applications may be associated with security classifications. As another example, role-based entitlements may be associated with enterprise users, and such entitlements may then be associated with security classifications. A repository (e.g., enterprise data storage platform 130) may be utilized to store security classifications, and/or associations between security classifications and security profiles of applications.

In some embodiments, real-time content classification computing platform 110 may determine the security classification for the content based on keywords, formatting, a source application, a destination application, users associated with the source and/or destination application, and so forth. For example, the content may include terms such as "confidential," "private," "secured," "internal communication," "privileged," "attorney-client," "attorney-work product," "limited circulation," "do not forward," and so forth. Real-time content classification computing platform 110 may determine the security classification based on such keywords. For example, upon detecting the phrase "do not forward" in an electronic communication, real-time content classification computing platform 110 may prohibit further dissemination of the electronic communication.

In some embodiments, real-time content classification computing platform 110 may train a machine learning model to perform the determining the security classification for the content. In some examples, the training may be unsupervised. For example, the machine learning model may utilize an output of the analyzing of the content to learn to determine the security classification. For example, identifying an anomalous pattern based on a context of the content may be a form of unsupervised learning. For example, cluster analysis may be utilized to group historical textual data, identify shared attributes, detect formatting patterns, read macros for files, and/or create rules for pattern recognition based on such rules. One or more neural network models may be utilized to train the machine learning model.

Unsupervised learning may be utilized, for example, to detect unknown patterns. For example, the machine learning model may analyze large volumes of textual data with secure enterprise information obfuscated in various manners. Based on such analysis, the machine learning model may detect hidden patterns in the information. Also, for example, as more data is intercepted via the networks (e.g., unlabeled data), the machine learning model may continually learn to detect additional patterns. Many available techniques for unsupervised learning may be utilized, such as, for example, clustering, partitioning, agglomerative, clustering of data based on fuzzy sets, probabilistic clustering, and so forth. Also, for example, clustering techniques may include, for example, hierarchical clustering, K-means clustering, singular value decomposition, principal component analysis ("PCA"), and so forth.

In some embodiments, real-time content classification computing platform 110 may train a machine learning model based on supervised learning methods. For example, labeled data may be provided to the machine learning model. For example, one or more rules may be provided to the machine learning model. Also, for example, when real-time content classification computing platform 110 detects an anomalous pattern, this may be verified as anomalous or not by a domain expert, and such labeled data may be provided to the machine learning model.

For example, operations manuals, human resource documents, human resource data, employee data, and so forth may be formatted and/or stored in a structured format. Machine learning models may be trained to recognize confidential information based on such structured formatting. For example, a machine language model may be provided with labeled training data that includes documents in specified structured formats and/or including key phrases, that may be labeled as non-confidential, confidential, highly confidential, highly confidential trade secret, highly confidential proprietary information, highly confidential personal information, and so forth. For example, supplier lists may be formatted and/or stored in a structured format. In many instances, supplier lists may be classified as highly confidential trade secret information. As another example, an enterprise organization's contractual documents may be marked "Confidential" and real-time content classification computing platform 110 may analyze the content to identify it as confidential information.

In some embodiments, real-time content classification computing platform 110 may train the machine learning model to recognize social security numbers, dates of birth, phone numbers, addresses, health related information, passwords, credit card numbers, bank account numbers, citizenship, immigration status, ethnicity, gender, disability status, and so forth. Accordingly, based on the trained model, real-time content classification computing platform 110 may perform the determining the security classification for the content.

In some embodiments, real-time content classification computing platform 110 may train a machine learning model to generate a new security classification. For example, new legislation in a particular authority may identify certain data and apply a security classification to such data. Accordingly, real-time content classification computing platform 110 may train the machine learning model to generate a new security classification based on such new legislation. Subsequently, real-time content classification computing platform 110 may perform the determining the security classification for the content based on the new security classification.

As another example, when clustering techniques are used for classification, real-time content classification computing platform 110 may identify new classes of secured information. Accordingly, such new classes may comprise a new security classification. For example, as documents and/or information are updated, real-time content classification computing platform 110 may perform a clustering based on keywords, and identify new clusters. In some embodiments, a new identified cluster may be provided to a manager for review. In some instances, the manager may determine that the identified cluster belongs to an existing security classification. In some embodiments, the manager may determine that the identified cluster is a new security classification, and may, in some instances, identify a label for the new security classification. As data flows through the networks in real-time, existing security classifications may be merged together, new classifications may be added, and/or an existing classification may be further sub-divided, or rendered obsolete.

Given the large volumes of data generated over the networks, much of the training data may not be labeled. Accordingly, real-time content classification computing platform 110 may also train the machine learning model based on semi-supervised learning methods. For example, some of the textual data in the electronic communication may be identified as anomalous patterns by domain experts, and may be provided to the machine learning model as labeled data.

In some instances, there may be an attempt to disclose confidential and/or protected information to parties external to the organization. For example, an enterprise user with access to confidential information may attempt to disclose such information to an external party. Such an attempt may include, in some instances, an electronic communication where secure enterprise information is obfuscated. For example, secure enterprise information may be intertwined into a sentence, or converted to another form. Accordingly, an ability to recognize a context of the electronic communication may be an important factor to determine a security classification. In some embodiments, the secure enterprise information may be in encrypted format, and real-time content classification computing platform 110 may decrypt, via the computing device, the anomalous pattern to identify the secure enterprise information, and thereby determine the security classification.

In some embodiments, real-time content classification computing platform 110 may identify, for the particular data transmission, one or more prior transmissions associated with the particular data transmission, and determine prior content associated with the one or more prior transmissions. In some instances, electronic communications may be sent over a network, and additional information may be added by recipients of the communications. In some instances, each sender may be unaware of a downstream content as the communication is forwarded. Also, for example, as the electronic communication gets modified, a security classification may be modified as well. However, recipients and senders of such communications may not always update the security classification. This may lead to inadvertent lapses in security, and may also enable unauthorized use of confidential information. In some embodiments, the one or more prior transmissions may be limited to a time interval preceding the particular data transmission. For example, the one or more prior transmissions may have been transmitted within a certain interval of time (e.g., 30 minutes, a day, a month, and so forth) of the time of transmission of the particular data transmission. The interval of time may depend on a content of the particular data transmission.

For example, a first data transmission may include a first electronic communication initiated by User 1 (e.g., a sales representative) and transmitted to User 2 (e.g., a Regional Sales Director). The electronic communication may have included publicly available information related to a competitor, say Company A, of the enterprise organization. Accordingly, the first data transmission may not have been associated with a security classification. User 2 (e.g., the Regional Sales Director) may initiate a second data transmission to User 3 (e.g., Senior Vice President of Sales and Marketing) by forwarding the first electronic communication, attaching a report on revenue trends over the last 10 years, and projected revenue for the enterprise organization over the next 5 years, with a note stating, "Sharp decline predicted. Explore options discussed previously?" This generates a second electronic communication. In some instances, the second data transmission may not be associated with a security classification, and/or may be associated with an incorrect security classification. Accordingly, there may be a need to identify an appropriate security classification, and to associate the security classification with future related data transmissions related to the second data transmission.

In some embodiments, User 3 (e.g., Senior Vice President of Sales and Marketing) may initiate a third data transmission to User 4 (e.g., Chief Executive Officer) by forwarding the second electronic communication (thereby generating a third electronic communication) with a note stating, "Explore merger options?" In some embodiments, User 4 (e.g., Chief Executive Officer) may initiate a fourth data transmission (e.g., the particular data transmission) by responding to User 3 (e.g., Senior Vice President of Sales and Marketing) with a note, "Urgent: send proposed merger talking points for Board."

Accordingly, the first, second and third data transmissions comprise the one or more prior transmissions associated with the particular data transmission. The prior content associated with the one or more prior transmissions comprise the first, second and third electronic communications. In some embodiments, real-time content classification computing platform 110 may determine the security classification based on the prior content. As illustrated, each data transmission has a potentially elevated security classification level. However, as the electronic communications are shared, each enterprise user may not be aware of the elevated classification level. As a result, such a data transmission may be inadvertently shared with enterprise users without appropriate entitlements. Also, for example, such information may be shared with a recipient external to the enterprise organization. As another example, such information may be shared with enterprise and/or external applications that may not have adequate use restrictions. As another example, such information may be stored in a repository that may not be adequately secured. Accordingly, it may be particularly advantageous for an enterprise organization to have an ability to determine the security classification in real-time while data is in transit from one network node to the next.

In some instances, providing publicly available information related to Company A may not in itself be deemed as highly confidential. To the extent the enterprise organization and Company A are known competitors, each may be reasonably expected to retrieve and/or analyze information about the other. However, the second data transmission that includes the report on revenue trends over the last 10 years, and projected revenue for the enterprise organization over the next 5 years, may be deemed to be "Highly Confidential Trade Secret Information." In some embodiments, as described herein, real-time content classification computing platform 110 may identify an appropriate classification level for the second data transmission based on the content. For example, real-time content classification computing platform 110 may apply the trained machine learning model to analyze a format and/or content of the attachment and identify the second data transmission as "Highly Confidential Trade Secret Information." However, despite the security classification, there may be several senior executives who may be privy to information in the second data transmission. As described herein, real-time content classification computing platform 110 may associate the security classification with user entitlements to determine potentially unauthorized data transmissions.

The third and fourth data transmissions may be deemed to be "Highly Confidential Proprietary Information." For example, the suggestion in the third data transmission to "explore merger options" may be highly sensitive information. Also, for example, the suggestion, when combined with an analysis of Company A and the revenue report, may indicate, with a high level of certainty, an intent of the enterprise organization to merge with Company A. Furthermore, the urgent request in the fourth data transmission for talking points related to a proposed merger, and the indication that this information is to be shared with the Board, further indicates imminent merger and acquisition activity. Such information is likely to be available to a handful of senior executive leaders. Also, for example, any public exposure of this sensitive information may be highly detrimental to the enterprise organization, and may lead to significant consequences, including in the trading of publicly held shares, effects on the reputation, goodwill and/or trademark of the company, and/or may cause a significant impact on the related industry segment. Accordingly, real-time content classification computing platform 110 may determine the security classification to be "Highly Confidential Proprietary Information," and/or may modify security profiles associated with applications (e.g., entitlements, access restrictions, and so forth) to secure such information in future data transmissions.

In some embodiments, real-time content classification computing platform 110 may identify, for the particular data transmission, a reported security classification for the content. For example, in the preceding example, the first data transmission may be marked as "Confidential Information." Accordingly, the third and fourth data transmissions may inherit the same security classification. However, as described herein, real-time content classification computing platform 110 may determine the security classification for the third and fourth data transmissions to be "Highly Confidential Proprietary Information." In some embodiments, real-time content classification computing platform 110 may detect an anomaly between the reported security classification and the determined security classification. For example, real-time content classification computing platform 110 may detect an anomaly between the reported security classification, "Confidential Information," and the determined security classification, "Highly Confidential Proprietary Information." In some embodiments, as further described herein, real-time content classification computing platform 110 may trigger one or more security actions based on the detected anomaly. In some embodiments, real-time content classification computing platform 110 may determine the security classification based on a trained machine learning model. Accordingly, real-time content classification computing platform 110 may modify the reported security classification by updating it to the determined security classification.

At step 205, real-time content classification computing platform 110 may cause, in real-time via the computing device, the content to be marked with the determined security classification. For example, for the third and fourth data transmissions in the preceding example, real-time content classification computing platform 110 may mark the content of the third and fourth third and fourth data transmissions with the determined security classification, "Highly Confidential Proprietary Information." In some embodiments, real-time content classification computing platform 110 may add the phrase "Highly Confidential Proprietary Information" to the top of the associated electronic communications. In some embodiments, real-time content classification computing platform 110 may cause the determined security classification to be on a header of a data packet associated with the data transmission. In some embodiments, real-time content classification computing platform 110 may cause the determined security classification to be indicated on metadata associated with the content of the data transmission. In some embodiments, real-time content classification computing platform 110 may track future exchanges of electronic communications associated with the particular data transmission (e.g., the third and fourth data transmissions), and cause the determined security classification to be applied to such future exchanges of electronic communications. For example, real-time content classification computing platform 110 may mark the particular data transmission with the determined security classification, and may cause future data packets for data transmissions related to the particular data transmission to be configured so as to apply enhanced security protocols. For example, such data packets may have restricted source and/or destination internet protocol ("IP") addresses, data flow restricted via specified networks, restricted server intercepts, restricted storage criteria, prohibition of transmission outside an internal enterprise network, and so forth.

In some embodiments, a security profile associated with an application may include one or more of: an entitlement, a data classification, a use restriction, a risk profile, and a third-party policy. For example, in a large enterprise organization (e.g., a financial institution), various enterprise applications may be deployed within the organization for enterprise users. Many such applications may have use restrictions based on a type of application, and a business role of an enterprise user.

Generally, an entitlement may be associated with an enterprise user or an enterprise system, where the entitlement indicates a type of information that the enterprise user and/or enterprise system may be entitled to send and/or receive. An entitlement may be based, for example, on a business role of the enterprise user within the enterprise organization. In some instances, the entitlement may be based on a physical and/or geographical location of the enterprise user. For example, an enterprise user logging in remotely may have entitlements that may be different from when the enterprise user may be within a secured facility, such as an office. Also, for example, an enterprise user traveling (e.g., to a foreign destination) may have entitlements that may be different from when the enterprise user may be within their allocated home region. A data transmission may include information about respective entitlements for a sender and/or recipient of the data transmission. In some embodiments, real-time content classification computing platform 110 may retrieve such entitlements from a data repository (e.g., enterprise data storage platform 130).

A use restriction, as used herein, generally refers to an attribute of an enterprise application (e.g., first enterprise application 140, second enterprise application 150), or that of an application provided by a third-party vendor application (e.g., external application 160), where the attribute indicates, for example, a range of activities that enterprise users and/or enterprise systems may be able to perform via the application, the application-related resources that enterprise users and/or enterprise systems may have access to, and types of functions that enterprise users and/or enterprise systems may be allowed to perform on application data. For example, there may be a need for a web application to protect front-end and back-end data and system resources by implementing use restrictions on how users may interact with enterprise applications, what resources enterprise applications have access to, and what functions enterprise applications may be allowed to perform on the data. The use restrictions may facilitate protections against unauthorized viewing, modification, or copying of data.

A data classification, as used herein, may be a level of security associated with a content of a data transmission. For example, some data transmissions may include highly confidential information. Also, for example, some data transmissions may include no confidential information. In some instances, content of a data transmission may be updated as it may be exchanged between enterprise users, with each enterprise user adding to the content. In such instances, the data classification for the content may evolve over time, from one transmission to the next. Accordingly, it may be beneficial to correlate each data transmission with an entitlement and/or a use restriction. For example, an enterprise user and/or enterprise system associated with a certain entitlement may have access to data transmissions that include content with a particular type of data classification. As the content may be modified, changes in corresponding security protocols may not be authenticated, thereby leading to potentially unauthorized data transmissions to enterprise users and/or third-party vendors that do not have adequate access permissions.

In some embodiments, a risk profile may be associated with an enterprise user and/or an enterprise system. As described in detail herein, the risk profile of an enterprise user may be indicative of a likelihood of the enterprise user to send and/or receive secure enterprise information. Likewise, a risk profile of an application may be indicative of a likelihood of the application to transmit secure enterprise information. Risk profiles may be determined based on a number of factors, including, but not limited to, security threat landscape assessments for internal and external threats.

Third-party policies may be associated with a third-party vendor application (e.g., external application 160), where such policies may indicate a range of activities that enterprise users and/or enterprise systems may be able to perform via the third-party vendor application, the application-related resources that enterprise users and/or enterprise systems may have access to, and types of functions that enterprise users and/or enterprise systems may be allowed to perform on application data. Third-party policies may also indicate a type of permissible interaction of enterprise users and/or enterprise systems with the third-party vendor application.

In some embodiments, real-time content classification computing platform 110 may retrieve, via the computing device and from a repository and for the particular data transmission, a first security profile associated with a source application, and a second security profile associated with a destination application. For example, real-time content classification computing platform 110 may retrieve, from a repository (e.g., enterprise data storage platform 130) a first security profile associated with the source application, and a second security profile associated with the destination application. For example, the first security profile associated with the source application may indicate that the source application may be authorized to send the data transmission. As another example, the second security profile associated with the destination application may indicate that the destination application may not be authorized to receive the data transmission.

Figure 3:
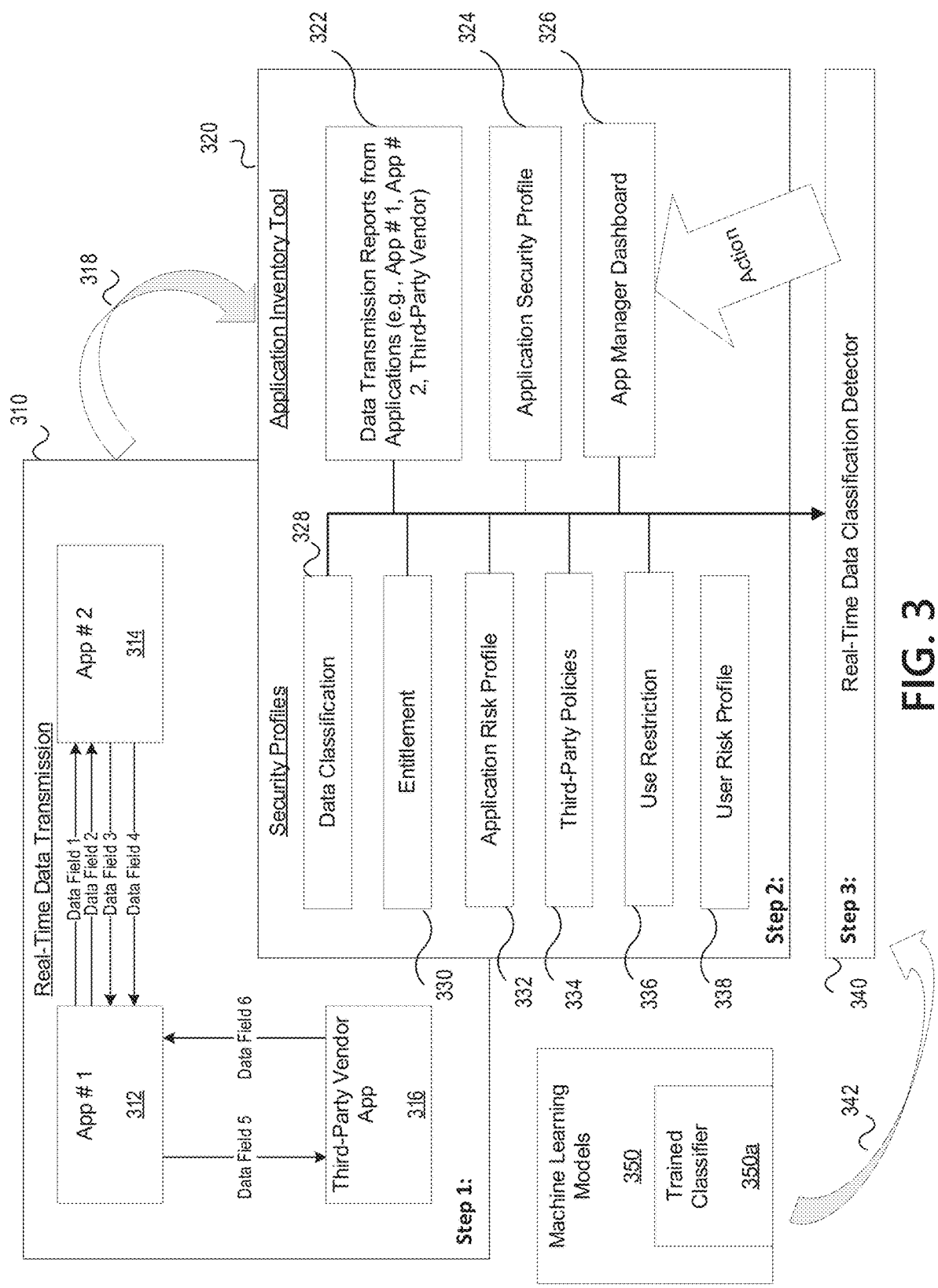
FIG. 3 depicts an illustrative method for a real-time classification of content in a data transmission in accordance with one or more example embodiments.

FIG. 3 depicts an illustrative method for a real-time classification of content in a data transmission in accordance with one or more example embodiments. At step 1, real-time data transmission 310 is depicted. App #1 312 may be, for example, first enterprise application 140; App #2 314 may be, for example, second enterprise application 150; and Third-party Vendor App 316 may be, for example, external application 160. As indicated, "Data Field 1" and "Data Field 2" may be sent by App #1 312 with App #2 314 as the intended recipient. Also, for example, "Data Field 3" and "Data Field 4" may be sent by App #2 314 with App #1 312 as the intended recipient. As another example, "Data Field 5" may be sent by App #1 312 with Third-party vendor app 316 as the intended recipient; whereas "Data Field 6" may be sent by Third-party vendor app 316 with App #1 312 as the intended recipient.

This information may be collected and provided to an Application Inventory Tool 320 (as indicated by arrow 318), which, at step 2, may display the information via an App Manager Dashboard 326 to an enterprise user, such as a security expert, who may optionally review the information from time to time. In some embodiments, App Manager Dashboard 326 may be provided as a graphical user interface. As data flows occurs over the network of devices and applications, the information may be updated in real-time. Although six data fields are shown for illustrative purposes, generally there may be millions of data fields.

As indicated, real-time content classification computing platform 110 may retrieve security profiles, including a data classification 328, an entitlement 330, an application risk profile 332, third-party policies 334, a use restriction 336, a user risk profile 338, and an application risk profile 324. In some embodiments, real-time content classification computing platform 110 may retrieve data transmission reports 322 from App #1 312, App #2 314, and/or Third-party vendor app 316. The data transmission reports 322 may include information about the data transmission, such as, for example, a timestamp, an identifier indicating a source and a destination, an identifier of an enterprise user and/or enterprise system associated with the source application and/or the destination application, a data classification for a content associated with the data transmission, and so forth. All such information from application inventory tool 320 may be provided to real-time data classification detector 340, which may, in turn correlate such information to determine a security classification. In some embodiments, one or more machine learning models 350 may be trained and/or applied to aid in detecting existing security classifications, determining security classifications, identifying new security classifications, and so forth. As illustrated, the one or more machine learning models 350 may include a trained classifier 350a that may be configured to perform tasks related to security classifications. In some embodiments, real-time data classification detector 340 may utilize the one or more machine learning models 350 to determine the security classification, as indicated by arrow 342.

In some embodiments, real-time content classification computing platform 110 may compare, via the computing device and for each data transmission, the first security profile to the second security profile. Generally, each security profile may be associated with quantifiable parameters that may enable comparisons. For example, each entitlement may be represented symbolically thereby designating different enterprise users with symbols that may be indicative of their entitlement. Also, for example, each use restriction may be associated with a range of values and/or parameters that may indicate levels of access to an application. As another example, application risk profiles and user risk profiles may be associated with confidence scores and/or other discrete parameters that may be indicative of the respective risk profiles. Accordingly, for example, an entitlement and a risk profile may be compared quantitatively. For example, different levels of entitlements may be associated with different confidence levels for risk profiles, and real-time content classification computing platform 110 may make quantitative comparisons to determine an overlap.

For example, real-time content classification computing platform 110 may compare a first use restriction associated with App #1 (e.g., first enterprise application 140) with second use restriction associated with App #2 (e.g., second enterprise application 150). For example, App #1 (e.g., first enterprise application 140) may be an accounting application and first use restriction may restrict App #1 to the enterprise organization's internal audit team, whereas App #2 (e.g., second enterprise application 150) may be a web resource application and second use restriction may provide access to App #2 to all employees of the enterprise organization.

As another example, real-time content classification computing platform 110 may compare a first application risk profile associated with App #1 (e.g., first enterprise application 140) with second application risk profile associated with App #2 (e.g., second enterprise application 150). For example, App #1 (e.g., first enterprise application 140) may be associated with first application risk profile indicative of a higher vulnerability to external security threats, and App #2 (e.g., second enterprise application 150) may be associated with second application risk profile indicative of a lower level vulnerability to external security threats.

Additional and/or alternative comparisons may be made by real-time content classification computing platform 110, for example, between third-party policies, entitlements, user risk profiles, and so forth. Also, for example, an application risk profile may be compared to a third-party policy, an entitlement, a user risk profile, and so forth. In some embodiments, real-time content classification computing platform 110 may detect, based on a determination that the first security profile does not match the second security profile, a potentially unauthorized data transmission. Real-time content classification computing platform 110 may subsequently retrieve the content of the potentially unauthorized data transmission, and then analyze the retrieved content to determine an appropriate security classification.

In some embodiments, real-time content classification computing platform 110 may identify a user associated with the source application, and the retrieving the first security profile may include retrieving an entitlement associated with the user, and the comparing the first security profile to the second security profile may include comparing the entitlement with the second security profile. For example, real-time content classification computing platform 110 may compare first entitlement associated with a first user (corresponding to App #1), with second entitlement associated with a second user (corresponding to App #2). Similarly, real-time content classification computing platform 110 may compare a first entitlement associated with the first user (corresponding to App #1), with second user risk profile associated with the second user (corresponding to App #2). For example, the first user may be a senior executive and first entitlement may provide the first user access to confidential resources of the enterprise organization, and the second user may be an enterprise user, and second user risk profile may indicate if the second user may receive a data transmission from the first user.

In some embodiments, real-time content classification computing platform 110 may identify a first user associated with the source application, and may identify a second user associated with the destination application. Real-time content classification computing platform 110 may then perform the retrieving the first security profile by retrieving a first entitlement associated with the first user, may perform the retrieving the second security profile by retrieving a second entitlement associated with the second user, and may perform the comparing the first security profile to the second security profile by comparing the first entitlement with the second entitlement.

As described herein, given the nature of the network data, a large number of applications, and a volume of data transmission activity, it may be highly improbable for a human being to retrieve, collect and/or analyze content related to such network activity. In particular, a computing device would need to be configured to detect network activity. Also, for example, due to the real-time nature of the collection activity, a computing device would need to be configured to retrieve content related to data transmissions. Moreover, a specialized computer would need to be configured to determine the security classifications in real-time. Also, as may be appreciated, security profiles associated with applications may be retrieved from repositories, and may be compared to detect if an anomalous data transmission has occurred. Accordingly, processing such tasks by utilizing mental steps may be highly unlikely, and impractical. Also, for example, determining a security classification in real-time may be particularly advantageous, so as to prevent and/or otherwise mitigate related data transmissions. As such, the techniques, as described herein, actually prevent a normal, expected operation of a conventional computer by overriding sequences that may be routine and/or conventional, to determine a security classification, and mitigate effects of unmarked, and/or incorrectly marked content in data transmissions, thereby improving the technical functioning of the computer.

In some embodiments, real-time content classification computing platform 110 may determine, prior to the retrieving the first security profile and the second security profile, and for each data transmission of the plurality of data transmissions, a first indication whether the data transmission was sent by the source application, and a second indication whether the data transmission was received by the destination application. Real-time content classification computing platform 110 may then compare, via the computing device and in real-time and for each data transmission of the plurality of data transmissions, the first indication and the second indication, and detect, via the computing device and based on a determination that the first indication does not match the second indication, an anomalous data transmission. In some embodiments, the retrieving the first security profile and the second security profile may be performed for the anomalous data transmission.

In general, referring again to FIG. 3, when a data transmission may be sent from or received by a first application (e.g., first enterprise application 140), this information may be recorded in a first table that displays a report view (e.g., data transmission reports 322) for App #1 312. Likewise, when a data transmission may be sent from or received by a second application (e.g., second enterprise application 150), this information may be recorded in a second table that displays a report view (e.g., data transmission reports 322) for App #2 314. As data flows occur over the network of devices and applications, each of these tables may be updated in real-time. Accordingly, real-time content classification computing platform 110 may compare rows from different tables to determine if there is a match between a first indication that a data transmission was sent and a second indication that a data transmission was received. For example, real-time content classification computing platform 110 may identify a data transmission along with a source application (e.g., first enterprise application 140) and an intended destination application (e.g., second enterprise application 150). In some embodiments, real-time content classification computing platform 110 may access enterprise data storage platform 130 to retrieve an updated first table associated with the source application (e.g., App #1 312), and retrieve an updated second table associated with the intended destination application (e.g., App #2 314), to determine if there is a corresponding row in the updated second table, that indicates that the destination application received the data transmission.

In some embodiments, real-time content classification computing platform 110 may identify, from an inspection of the first table, that "Data Field 2" was transmitted by App #1 312 with App #2 314 as the intended recipient. However, upon inspecting the rows in the second table, real-time content classification computing platform 110 may detect that there is no row in the second table that corresponds to or matches the row of the first table that indicates that "Data Field 2" was sent. Accordingly, real-time content classification computing platform 110 may detect that the particular data transmission of "Data Field 2" was not received by App #2 314. Accordingly, transmission of "Data Field 2" may be identified as a potentially anomalous data transmission, and real-time content classification computing platform 110 may retrieve the first security profile and the second security profile for the potentially anomalous data transmission to further determine if an unauthorized data transmission has occurred.

Many large enterprises, such as, for example, financial institutions, may utilize various computing infrastructure to transact business with their customers. Such transactions may include secure enterprise information, such as confidential information, protected information, and/or other sensitive data that is created and/or used for various purposes.

It may therefore be particularly advantageous to protect the integrity and confidentiality of the underlying secure enterprise information and deter a breach of confidentiality, and/or data privacy. For example, as described, if two enterprise applications or a third-party vendor application may be communicating with each other, then each of them may report data (e.g., displayed in data transmission reports 322) that is sent and/or received. Accordingly, when real-time content classification computing platform 110 analyzes the reports from each application, it may find complementing information (data that was sent was also received by the intended recipient), or real-time content classification computing platform 110 may detect a discrepancy. Accordingly, by detecting data transmissions, real-time content classification computing platform 110 may identify data leaks where transmitted data is not received by the intended recipient, and/or incorrect data transmissions.

In some embodiments, real-time content classification computing platform 110 may, based on a determination that the determined security classification is compatible with one or more of the first security profile and the second security profile, release the particular data transmission to the destination application. For example, real-time content classification computing platform 110 may determine that there is a match between a first entitlement associated with a first user sending the particular data transmission and a second entitlement associated with a second user receiving the particular data transmission, and that the determined security classification is compatible with the first entitlement and the second entitlement As another example, real-time content classification computing platform 110 may determine that a reported security classification for the content is consistent with the determined security classification. Accordingly, real-time content classification computing platform 110 may release the intercepted data transmission, and allow it to proceed to the intended destination application.

In some embodiments, real-time content classification computing platform 110 may, based on a determination that the determined security classification is not compatible with one or more of the first security profile and the second security profile, trigger one or more security actions for the particular data transmission. For example, real-time content classification computing platform 110 may determine that a first entitlement associated with a first user sending the particular data transmission does not match a second entitlement associated with a second user receiving the particular data transmission. In some embodiments, real-time content classification computing platform 110 may determine that a first entitlement associated with a first user sending the particular data transmission is not compatible with the determined security classification, and/or that a second entitlement associated with a second user receiving the particular data transmission is not compatible with the determined security classification. In such instances, real-time content classification computing platform 110 may trigger the one or more security actions for the particular data transmission.

Generally, upon a determination that the determined security classification is not compatible with one or more of the first security profile and the second security profile, real-time content classification computing platform 110 may take steps to further investigate the particular data transmission, and/or take steps to mitigate consequences of a potentially unauthorized data transmission, and/or take steps to mitigate consequences of an unmarked or incorrectly marked content of the particular data transmission. In some embodiments, the one or more security actions may include preventing related data transmissions. For example, real-time content classification computing platform 110 may identify the source application of the particular data transmission, and may automatically prevent the source application from sending related data transmissions. For example, the particular data transmission may be part of a stream of data packets that may be transmitted by the source application, and upon a determination that the determined security classification is not compatible with one or more of the first security profile and the second security profile, real-time content classification computing platform 110 may intercept data packets in transit, and/or prevent future data packets from being transmitted (e.g., by first enterprise application 140). As another example, upon a determination that the determined security classification is not compatible with one or more of the first security profile and the second security profile, real-time content classification computing platform 110 may identify an intended and/or actual destination for the particular data transmission, and prevent the intended and/or actual destination from receiving future data transmissions (e.g., by second enterprise application 150). As another example, when the destination application may be an external vendor application (e.g., external application 160), real-time content classification computing platform 110 may, upon a determination that the determined security classification is not compatible with one or more of the first security profile and the second security profile, intercept related data transmissions prior to these transmissions exiting the enterprise system to be delivered to an external vendor (e.g., external application 160).

In some embodiments, the one or more security actions may include modifying, via the computing device, an entitlement of an enterprise user associated with an application. For example, upon a determination that the determined security classification is not compatible with one or more of the first security profile and the second security profile, real-time content classification computing platform 110 may modify one or more entitlements for an enterprise user. For example, real-time content classification computing platform 110 may retrieve entitlements from enterprise data storage platform 130, modify them, store the modified entitlements on enterprise data storage platform 130, and/or send instructions to enterprise network management infrastructure 120 to modify the relevant entitlements. For example, real-time content classification computing platform 110 may prevent the enterprise user from accessing an external website, and/or may prevent the enterprise user from sending electronic mails (or not allow the enterprise user to attach documents).

In some embodiments, the one or more security actions may include modifying, via the computing device, one or more of the first security profile and the second security profile. For example, real-time content classification computing platform 110 may change entitlements for the enterprise user to enterprise resources and applications, may suspend or otherwise downgrade the enterprise user's risk profile, may notify enterprise security personnel of unauthorized activity, and/or suspected security breach, provide an alert to the enterprise user, alert a chain of management superior to the enterprise user, and so forth. Also, for example, real-time content classification computing platform 110 may modify use restrictions for applications. In some embodiments, real-time content classification computing platform 110 may restrict access to the enterprise application that may be associated with the particular data transmission. In some embodiments, real-time content classification computing platform 110 may change third-party policies for one or more vendor applications. For example, real-time content classification computing platform 110 may restrict user access to a vendor application unless the user may be on-site at an enterprise location.

In some embodiments, the one or more security actions may include generating a risk profile of an enterprise user associated with the particular data transmission, where the risk profile may be indicative of a likelihood of the enterprise user to transmit secure enterprise information. For example, a risk profile may be associated with an enterprise user based on a number of times an anomalous and/or unauthorized data transmission associated with the enterprise user may be detected. For example, an enterprise user may, while utilizing an enterprise application, send and/or receive data transmissions that may not be properly marked with a security classification. Accordingly, the enterprise user may be associated with such incorrectly marked and/or unmarked data transmissions. A frequency of such associations may be indicative of a potential data security breach. Accordingly, a risk profile may be generated for the enterprise user.

For example, each enterprise user may be associated with a numerical score indicative of a number of detected incorrectly marked and/or unmarked data transmissions associated with the enterprise user. In some embodiments, the risk profile may be based on a type of role for the enterprise user. For example, an enterprise user associated with access to highly confidential material may have a higher risk score associated with them. For example, if an incorrectly marked and/or unmarked data transmission is detected and is associated with an enterprise user with a lower security profile (e.g., a front desk reception personnel), a lower risk score may be associated with such activity. However, if an incorrectly marked and/or unmarked data transmission is detected and is associated with an enterprise user with a higher security profile (e.g., an executive with access to highly privileged information), a higher risk score may be associated with such activity. In some embodiments, real-time content classification computing platform 110 may identify security profiles based on existing entitlements associated with business roles, and may automatically determine a type of multiplier to be applied to an enterprise user's risk score based on a business role of the enterprise user.

In some embodiments, real-time content classification computing platform 110 may, based on a determination that the enterprise user is associated with an unauthorized data transmission (e.g., an incorrectly marked and/or unmarked data transmission), send a notification to the enterprise user. Subsequently, real-time content classification computing platform 110 may detect another unauthorized data transmission associated with the enterprise user. Based on such a detection, real-time content classification computing platform 110 may update the risk profile of the enterprise user to indicate a high likelihood of the enterprise user to transmit an additional unauthorized data transmission. In some embodiments, real-time content classification computing platform 110 may automatically analyze the content of each data transmission sent and/or received by the enterprise user to detect and mitigate potential unauthorized data transmissions. In some embodiments, real-time content classification computing platform 110 may modify entitlements associated with the enterprise user.

In some embodiments, the one or more security actions may include generating, based on the detecting, a risk profile of an application associated with the potentially unauthorized data transmission (e.g., an incorrectly marked and/or unmarked data transmission), where the risk profile may be indicative of a likelihood of the application to transmit secure enterprise information. For example, a risk profile may be associated with an enterprise application based on a number of times a potentially unauthorized data transmission (e.g., an incorrectly marked and/or unmarked data transmission) associated with the enterprise application is detected. For example, the enterprise application may send and/or receive a potentially unauthorized data transmission (e.g., an incorrectly marked and/or unmarked data transmission), and real-time content classification computing platform 110 may associate the enterprise application with the potentially unauthorized data transmission based on such activity. A frequency of such associations may be indicative of a potential data security breach. Accordingly, a risk profile may be generated for the enterprise application.

For example, each enterprise application may be associated with a numerical score indicative of a number of detected potentially unauthorized data transmissions associated with the enterprise application. In some embodiments, the risk profile may be based on a type of enterprise application. For example, an enterprise application associated with security related information may have a higher risk score associated with it. For example, if a potentially unauthorized data transmission is detected and is associated with an enterprise application with a lower security related profile (e.g., web resource with safe browsing links), a lower risk score may be associated with the enterprise application. However, if a potentially unauthorized data transmission is detected and is associated with an enterprise application with a higher security profile (e.g., a human resource application, a security monitoring application, an unauthorized user activity monitoring application), a higher risk score may be associated with the enterprise application. In some embodiments, real-time content classification computing platform 110 may identify security profiles based on existing security profiles associated with enterprise applications, and may automatically determine a type of multiplier to be applied to an enterprise application's risk score based on the security profile.

In some embodiments, the one or more security actions may include generating a notification for an application manager to review the potentially unauthorized data transmission (e.g., an incorrectly marked and/or unmarked data transmission). For example, real-time content classification computing platform 110 may generate a notification to an application manager to determine if they intend to send and/or receive a detected potentially unauthorized data transmission. As another example, real-time content classification computing platform 110 may generate a notification to a supervising manager responsible for an enterprise user associated with a potentially unauthorized data transmission. The supervising manager may then initiate one or more steps to further mitigate and/or prevent unauthorized activity by the enterprise user.

Figure 4:
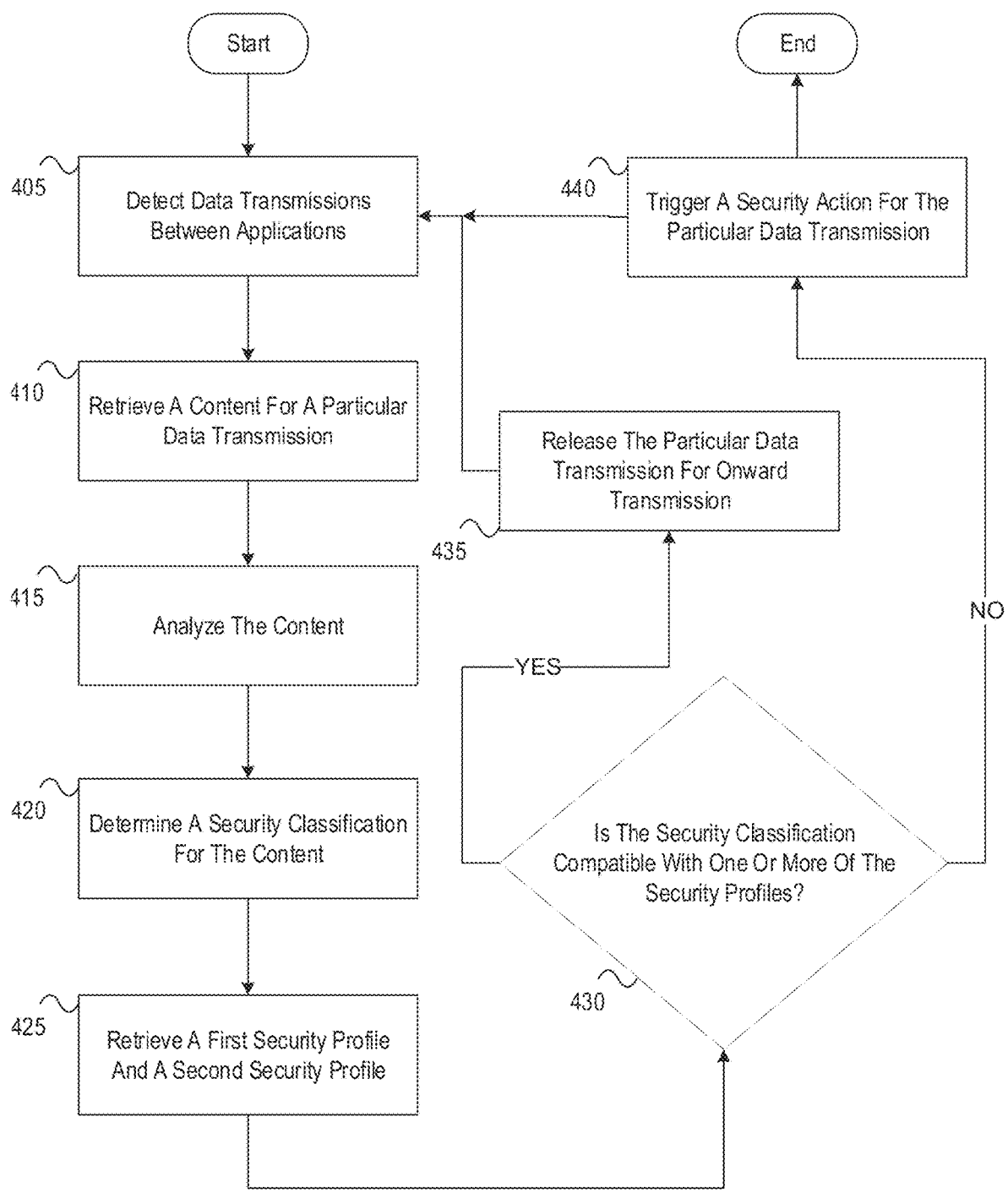
FIG. 4 depicts an illustrative method for a real-time classification of content in a data transmission in accordance with one or more example embodiments.

FIG. 4 depicts another illustrative method for a real-time classification of content in a data transmission in accordance with one or more example embodiments. Referring to FIG. 4, at step 405, a computing platform having at least one processor, a communication interface, and memory may detect, in real-time and via a computing device, a plurality of data transmissions between applications over a communications network. At step 410, the computing platform may retrieve, for a particular data transmission of the plurality of data transmissions, a content of the particular data transmission. At step 415, the computing platform may analyze, via the computing device, the content.

At step 420, the computing platform may determine, in real-time via the computing device and based on the analyzing, a security classification for the content. At step 425, the computing platform may retrieve, via the computing device and from a repository and for the particular data transmission, a first security profile associated with a source application, and a second security profile associated with a destination application. At step 430, the computing platform may determine if the security classification is compatible with one or more of the first security profile and the second security profile.

If at step 430, the computing platform determines that the security classification is compatible with one or more of the first security profile, the process may proceed to step 435. At step 435, the computing platform may release the particular data transmission for onward transmission to the destination application. In some embodiments, the process may return to step 405.

If at step 430, the computing platform determines that the security classification is not compatible with one or more of the first security profile and the second security profile, the process may proceed to step 440. At step 440, the computing platform may trigger one or more security actions for the particular data transmission. In some embodiments, the process may return to step 405. In some embodiments, the process may terminate.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular time-sensitive tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to implement one or more aspects of the disclosure more effectively, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   detect, in real-time and via a computing device, a plurality of data transmissions between applications over a communications network;
   retrieve, for a particular data transmission of the plurality of data transmissions, a content of the particular data transmission;
   analyze, via the computing device, the content;
   determine, in real-time via the computing device and based on the analyzing, a security classification for the content;
   cause, in real-time via the computing device, the content to be marked with the determined security classification;
   retrieve, via the computing device and from a repository and for the particular data transmission, a first security profile associated with a source application, and a second security profile associated with a destination application;
   based on a determination that the determined security classification is not compatible with one or more of the first security profile and the second security profile, trigger one or more security actions for the particular data transmission; and
   prior to the retrieving the first security profile and the second security profile, and for each data transmission of the plurality of data transmissions:
   determine a first indication, wherein the first indication is indicative whether the data transmission was sent by the source application, determine a second indication, wherein the second indication is indicative whether the data transmission was received by the destination application, compare, via the computing device and in real-time and for each data transmission of the plurality of data transmissions, the first indication and the second indication, and detect, via the computing device and based on a determination that the first indication does not match the second indication, an anomalous data transmission, and wherein the retrieving the first security profile and the second security profile is performed for the anomalous data transmission.

2. The computing platform of claim 1, wherein the instructions, when executed by the at least one processor, cause the computing platform to:

train a machine learning model to generate a new security classification.

3. The computing platform of claim 2, wherein the security classification for the content is based on the new security classification.

4. The computing platform of claim 1, wherein the instructions, when executed by the at least one processor, cause the computing platform to:

train a machine learning model to perform the determining the security classification for the content.

5. The computing platform of claim 4, wherein the instructions, when executed by the at least one processor, cause the computing platform to:

apply the machine learning model to perform the determining the security classification for the content.

6. The computing platform of claim 1, wherein the instructions, when executed by the at least one processor, cause the computing platform to:

identify, for the particular data transmission, one or more prior transmissions associated with the particular data transmission;

determine prior content associated with the one or more prior transmissions, and wherein the determining the security classification is based on the prior content.

7. The computing platform of claim 1, wherein the instructions, when executed by the at least one processor, cause the computing platform to:

identify, for the particular data transmission, a reported security classification for the content;

detect an anomaly between the reported security classification and the determined security classification; and trigger one or more security actions based on the detected anomaly.

8. The computing platform of claim 7, wherein the one or more security actions comprises:

modifying, based on a machine learning model, the reported security classification.

9. The computing platform of claim 1, wherein the instructions, when executed by the at least one processor, cause the computing platform to:

based on a determination that the determined security classification is compatible with one or more of the first security profile and the second security profile, release the particular data transmission to the destination application.

10. The computing platform of claim 1, wherein the instructions, when executed by the at least one processor, cause the computing platform to:

detect, based on a determination that the first security profile does not match the second security profile, a potentially unauthorized data transmission, and wherein the retrieving the content of the particular data transmission comprises retrieving the content of the potentially unauthorized data transmission.

11. The computing platform of claim 1, wherein the instructions, when executed by the at least one processor, cause the computing platform to:

identify a first user associated with the source application;

identify a second user associated with the destination application, and wherein the retrieving the first security profile comprises retrieving a first access authorization associated with the first user, and wherein the retrieving the second security profile comprises retrieving a second access authorization associated with the second user.

12. The computing platform of claim 1, wherein the one or more security actions comprise modifying, via the computing device, one or more of the first security profile and the second security profile.

13. The computing platform of claim 1, wherein the one or more security actions comprise preventing, via the computing device, a data transmission related to the particular data transmission.

14. The computing platform of claim 1, wherein the one or more security actions comprise generating a risk profile of an enterprise user associated with the particular data transmission, wherein the risk profile is indicative of a likelihood of the enterprise user to transmit an unauthorized data transmission.

15. The computing platform of claim 14, wherein the instructions, when executed by the at least one processor, cause the computing platform to:

based on a determination that the enterprise user is associated with an unauthorized data transmission, send a notification to the enterprise user;

detect another unauthorized data transmission associated with the enterprise user; and update the risk profile of the enterprise user to indicate a high likelihood of the enterprise user to transmit an additional unauthorized data transmission.

16. The computing platform of claim 1, wherein the one or more security actions comprise generating a risk profile of an application associated with the particular data transmission, and wherein the risk profile is indicative of a likelihood of the application to transmit an unauthorized data transmission.

17. A method, comprising:

at a computing platform comprising at least one processor, a communication interface, and memory:

detecting, in real-time and via a computing device, a plurality of data transmissions between applications over a communications network;

retrieving, for a particular data transmission of the plurality of data transmissions, a content of the particular data transmission;

analyzing, via the computing device, the content;

determining, in real-time via the computing device and based on the analyzing, a security classification for the content;

retrieving, via the computing device and from a repository and for the particular data transmission, a first security profile associated with a source application, and a second security profile associated with a destination application; and based on a determination that the security classification is not compatible with one or more of the first security profile and the second security profile, triggering one or more security actions for the particular data transmission;

prior to the retrieving the first security profile and the second security profile, and for each data transmission of the plurality of data transmissions:

determining a first indication, wherein the first indication is indicative whether the data transmission was sent by the source application, determining a second indication, wherein the second indication is indicative whether the data transmission was received by the destination application, comparing, via the computing device and in real-time and for each data transmission of the plurality of data transmissions, the first indication and the second indication, and detecting, via the computing device and based on a determination that the first indication does not match the second indication, an anomalous data transmission, and wherein the retrieving the first security profile and the second security profile is performed for the anomalous data transmission.

18. The method of claim 17, further comprising:

identifying, for the particular data transmission, one or more prior transmissions associated with the particular data transmission;

determining prior content associated with the one or more prior transmissions, and wherein the determining the security classification is based on the prior content.

19. One or more non-transitory computer-readable media storing instructions that, when executed by a computing platform comprising at least one processor, a communication interface, and memory, cause the computing platform to:

detect, in real-time and via a computing device, a plurality of data transmissions between applications over a communications network;

retrieve, for a particular data transmission of the plurality of data transmissions, a content of the particular data transmission;

analyze, via the computing device, the content;

determine, in real-time and based on a machine learning model, a security classification for the content;

cause, in real-time via the computing device, the content to be marked with the determined security classification;

retrieve, via the computing device and from a repository and for the particular data transmission, a first security profile associated with a source application, and a second security profile associated with a destination application;

based on a determination that the determined security classification is not compatible with one or more of the first security profile and the second security profile, trigger one or more security actions for the particular data transmission; and prior to the retrieving the first security profile and the second security profile, and for each data transmission of the plurality of data transmissions:

determine a first indication, wherein the first indication is indicative whether the data transmission was sent by the source application, determine a second indication, wherein the second indication is indicative whether the data transmission was received by the destination application, compare, via the computing device and in real-time and for each data transmission of the plurality of data transmissions, the first indication and the second indication, and detect, via the computing device and based on a determination that the first indication does not match the second indication, an anomalous data transmission, and wherein the retrieving the first security profile and the second security profile is performed for the anomalous data transmission.

20. The one or more non-transitory computer-readable media of claim 19 storing instructions that, when executed by the computing platform cause the computing platform to:

identify, for the particular data transmission, a reported security classification for the content;

detect an anomaly between the reported security classification and the determined security classification; and trigger one or more security actions based on the detected anomaly.

* * * * *